United States Patent
Gotou

(10) Patent No.: US 9,482,813 B2
(45) Date of Patent: Nov. 1, 2016

(54) LIGHTING DEVICE, DISPLAY DEVICE AND TELEVISION DEVICE

(71) Applicant: Sharp Kabushiki Kaisha, Osaka-shi, Osaka (JP)

(72) Inventor: Akira Gotou, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 14/780,020

(22) PCT Filed: Feb. 25, 2014

(86) PCT No.: PCT/JP2014/054450
§ 371 (c)(1),
(2) Date: Sep. 25, 2015

(87) PCT Pub. No.: WO2014/174885
PCT Pub. Date: Oct. 30, 2014

(65) Prior Publication Data
US 2016/0033716 A1    Feb. 4, 2016

(30) Foreign Application Priority Data
Apr. 25, 2013 (JP) .................. 2013-092384

(51) Int. Cl.
*F21V 8/00* (2006.01)
*G02F 1/13* (2006.01)
*H04N 3/12* (2006.01)

(52) U.S. Cl.
CPC ........... *G02B 6/0091* (2013.01); *G02B 6/0021* (2013.01); *G02B 6/0068* (2013.01); *H04N 3/127* (2013.01)

(58) Field of Classification Search
CPC  G02B 6/0021; G02B 6/0036; G02B 6/0073; G02B 6/0068; G02B 6/0091
USPC .......................................................... 362/613
See application file for complete search history.

(56) References Cited

U.S. PATENT DOCUMENTS

| | | | | |
|---|---|---|---|---|
| 8,842,233 B2* | 9/2014 | Oura | ................ | G02F 1/133615 349/58 |
| 2007/0008739 A1 | 1/2007 | Kim et al. | | |
| 2008/0297687 A1* | 12/2008 | Watanabe | ............ | G02B 6/0021 349/58 |
| 2012/0081922 A1* | 4/2012 | Yeh | ...................... | G02B 6/0021 362/612 |

FOREIGN PATENT DOCUMENTS

| | | |
|---|---|---|
| CN | 1892361 | 1/2007 |
| JP | 2011-232607 A | 11/2011 |
| JP | 2012-220689 A | 11/2012 |

* cited by examiner

*Primary Examiner* — Karabi Guharay
(74) *Attorney, Agent, or Firm* — Keating & Bennett, LLP

(57) ABSTRACT

In a lighting unit, a first light source unit includes light sources and a first board having a first mount portion and a first empty portion, a second light source unit includes light sources and a second board having a second mount portion and a second empty portion. The first light entrance portion is on one edge portion thereof and the first fixing portion is adjacent to the first light entrance portion and on the one edge portion and fixes the first light source unit in close contact with the first empty portion. The second light entrance portion is on another edge portion and overlapped with the first fixing portion. The second fixing portion is adjacent to the second light entrance portion and overlapped with the first light entrance portion. The second fixing portion is in close contact with the second empty portion to fix the second light source unit.

9 Claims, 11 Drawing Sheets

LIGHTING DEVICE, DISPLAY DEVICE AND TELEVISION DEVICE

TECHNICAL FIELD

The present invention relates to a lighting device, a display device and a television device.

BACKGROUND ART

In recent years, liquid crystal panels have been widely used as a display portion of television devices, cell phones, and tablet computers. The liquid crystal panels do not emit light, and therefore, light from a lighting unit (a backlight unit) is used. Such kind of lighting units are arranged on a rear surface side of the liquid crystal panel to be configured to emit planar light toward a rear surface of the liquid crystal panel.

An example of the kind that is disclosed in Patent Document 1 includes a light guide plate and LED light sources that are opposite an edge surface of the light guide plate. Such lighting units are known as side-lighting units (or edge light lighting units) and each includes the edge surface of the light guide plate as a light entrance surface and a front side surface of the light guide plate as a light exit surface.

In such a lighting unit, the LED light sources are arranged to have a clearance from the light entrance surface. It is preferable not to have any clearance between the LED light sources and the light entrance surface to obtain good use efficiency (light entrance efficiency) of light emitted by the LED light sources. However, a certain clearance is provided between the LED light sources and the light entrance surface with considering thermal expansion of the light guide plate, a tolerance of each component of the lighting unit, and an erection tolerance of components.

As is described in patent Document 1, the LED light sources are mounted on an LED board and the LED board includes a support member projecting therefrom. The support member is in contact with the light entrance surface to keep a distance (a clearance) between the light entrance surface and the LED light sources.

Patent Document 1: Japanese Unexamined Patent Publication No. 2012-220689

Problem to be Solved by the Invention

As is disclosed in Patent Document 1, a pair of LED light sources is arranged to be opposed to each other having the light guide plate therebetween. In such a configuration, the light entrance surfaces and the LED light sources necessarily have a clearance that is greater than a configuration having the LED light sources opposite only one light entrance surface with considering the erection tolerance of the components. Therefore, in such lighting units having the above configuration, the light entrance efficiency of light entering the light guide plate through the light entrance surface is decreased.

As is disclosed in Patent Document 1, the support member that is included in the LED board and keeps the clearance (the distance) between the light entrance surface and the LED light sources may block light entering the light guide plate through the light entrance surface. The light guide plate that is thermally expanded may push the support member with the edge surface (the light entrance surface) of the light guide plate, and accordingly, the support member may be broken or deformed. The support member may be arranged between adjacent LED light sources and in such a configuration, an interval between the adjacent LED light sources is increased and apart of rays of light emitted from the lighting unit may have an insufficient amount of light (uneven brightness).

Disclosure of the Present Invention

An object of the present invention is to restrict decrease in light entrance efficiency of light entering the light guide plate of a lighting unit including a pair of light source units that are arranged to be opposite each other with having the light guide plate therebetween.

Means for Solving the Problem

A lighting device according to the present invention includes a first light source unit, a second light source unit, and a light guide plate. The first light source unit includes a first light source group and a first elongated board having a first mount portion and a first empty portion disposed adjacent to the first mount portion. The first light source group includes light sources arranged in a line and the light sources of the first light source group are arranged on the first mount portion. The second light source unit includes a second light source group and a second elongated board having a second mount portion and a second empty portion disposed adjacent to the second mount portion. The second light source group includes light sources arranged in a line and the light sources of the second light source group are arranged on the second mount portion. The light guide plate is a plate member and includes a first light entrance portion, a first fixing portion, a second light entrance portion, a second fixing portion, and a light exit portion. The first light entrance portion is on one edge portion of the plate member and light from the light sources of the first light source group enters the light guide plate through the first light entrance portion. The first fixing portion is on the one edge portion adjacent to the first light entrance portion and fixes the first light source unit with being in close contact with the first empty portion. The second light entrance portion is on another edge portion of the plate member on opposite side from the one edge portion so as to be overlapped with the first fixing portion. Light from the light sources of the second light source group enters the light guide plate through the second light entrance portion. The second fixing portion is adjacent to the second light entrance portion and overlapped with the first light entrance portion and fixes the second light source unit with being in close contact with the second empty portion. The light exit portion is a plate surface of the plate member and light entering the light guide plate through the first light entrance portion and the second light entrance portion exits the light guide plate through the light exit portion.

According to the configuration of the lighting device, light entrance efficiency of light entering the light guide plate is less likely to lowered.

In the light guide plate of the lighting device, the first fixing portion may project toward an outer side from the first light entrance portion, and the second fixing portion may project toward the outer side from the second light entrance portion.

In the lighting device, the first board may have a shape such that a surface of the first mount portion where the light sources are mounted and a surface of the first empty portion that is in close contact with the first fixing portion are flush with each other, and the second board may have a shape such that a surface of the second mount portion where the light sources are mounted and a surface of the second empty portion that is in close contact with the second fixing portion are flush with each other.

In the lighting device, the first board may have a shape such that the first empty portion projects further than the light sources mounted on the first mount portion, and the second board may have a shape such that the second empty portion projects further than the light sources mounted on the second mount portion.

In the lighting device, the light guide plate may have a shape such that a surface of the first light entrance portion opposite the light sources of the first light source group and a surface of the first fixing portion that is in close contact with the first empty portion are flush with each other and a surface of the second light entrance portion opposite the light sources of the second light source group and a surface of the second fixing portion that is in close contact with the second empty portion are flush with each other.

In the lighting device, the first light source unit may be fixed to the light guide plate such that the first empty portion is bonded to the first fixing portion with a double-sided adhesive tape, and the second light source unit may be fixed to the light guide plate such that the second empty portion is bonded to the second fixing portion with a double-sided adhesive tape. Thus, the first light source unit and the second light source unit are fixed to the light guide plate with a double-sided adhesive tape, and accordingly, the fixing operation is easier and effective.

In the lighting device, the light sources of the first light source group and the second light source group may be arranged at same intervals. The light sources of the first light source group and the second light source group are arranged at same intervals and accordingly, light enters the light guide plate evenly and unevenness in brightness is less likely to be caused.

A display device of the present invention includes the lighting device and a display panel displaying with using light from the lighting device.

The display panel may be a liquid crystal panel including a pair of substrates and liquid crystals sealed between the substrates.

A television device of the present invention includes the display device.

Advantageous Effect of the Invention

According to the present invention, in a lighting unit including a pair of light source units that are arranged to be opposite each other with having alight guide member therebetween, light entrance efficiency of light entering the light guide member is less likely to be decreased.

MODE FOR CARRYING OUT THE INVENTION

First Embodiment

Figure 1:
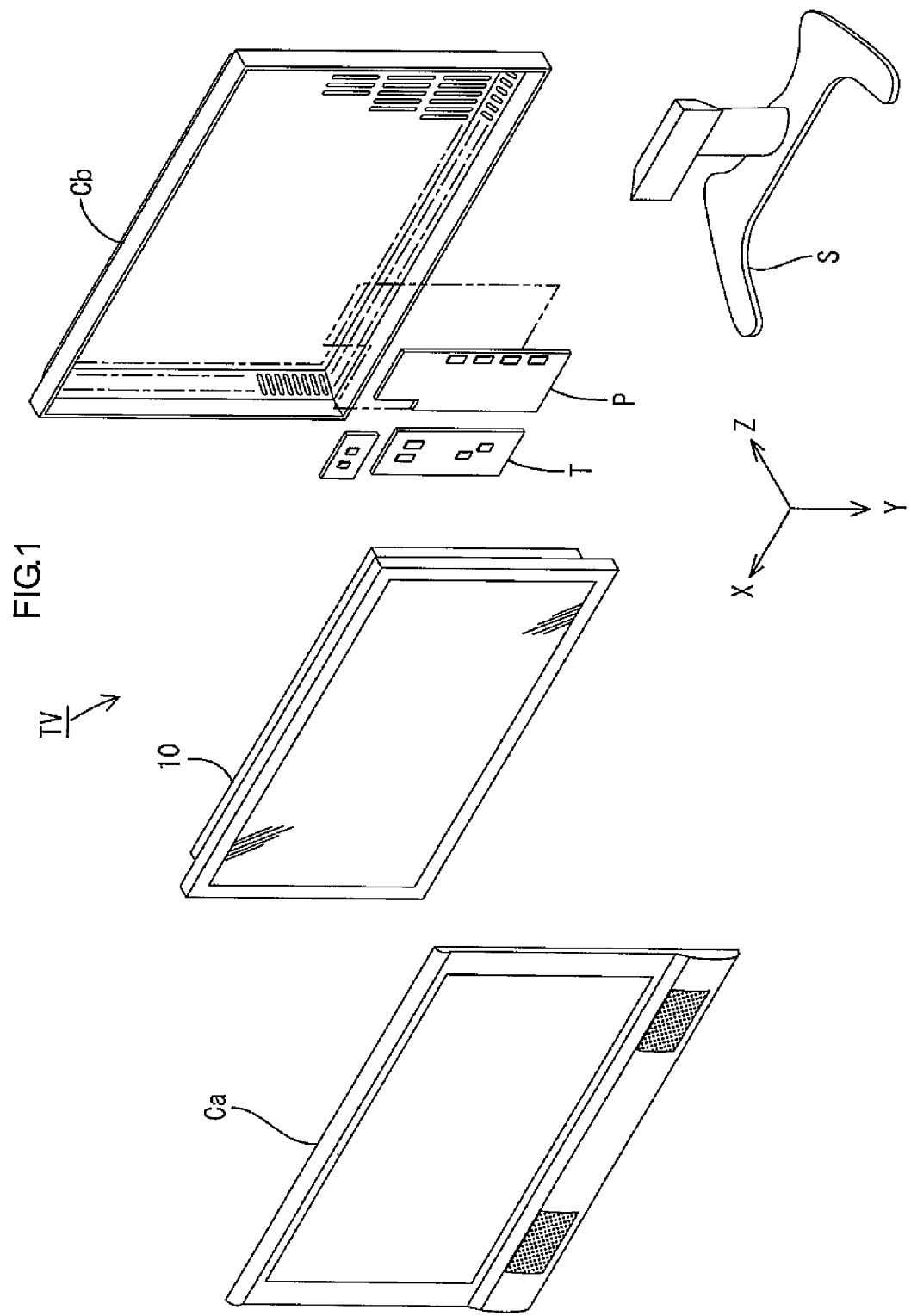
FIG. 1 is an exploded perspective view illustrating a schematic configuration of a television device according to a first embodiment of the present invention.

A first embodiment of the present invention will be described with reference to FIGS. 1 to 8. In this embodiment, a lighting unit 12, a liquid crystal display device 10 including the lighting unit 12, and a television device TV including the liquid crystal display device 10 will be described. X-axis, Y-axis and Z-axis may be present in the drawings. An upper side and a lower side in each of FIGS. 2 and 3 correspond to a front side and a back side of the liquid crystal display device 10, respectively.

Figure 2:
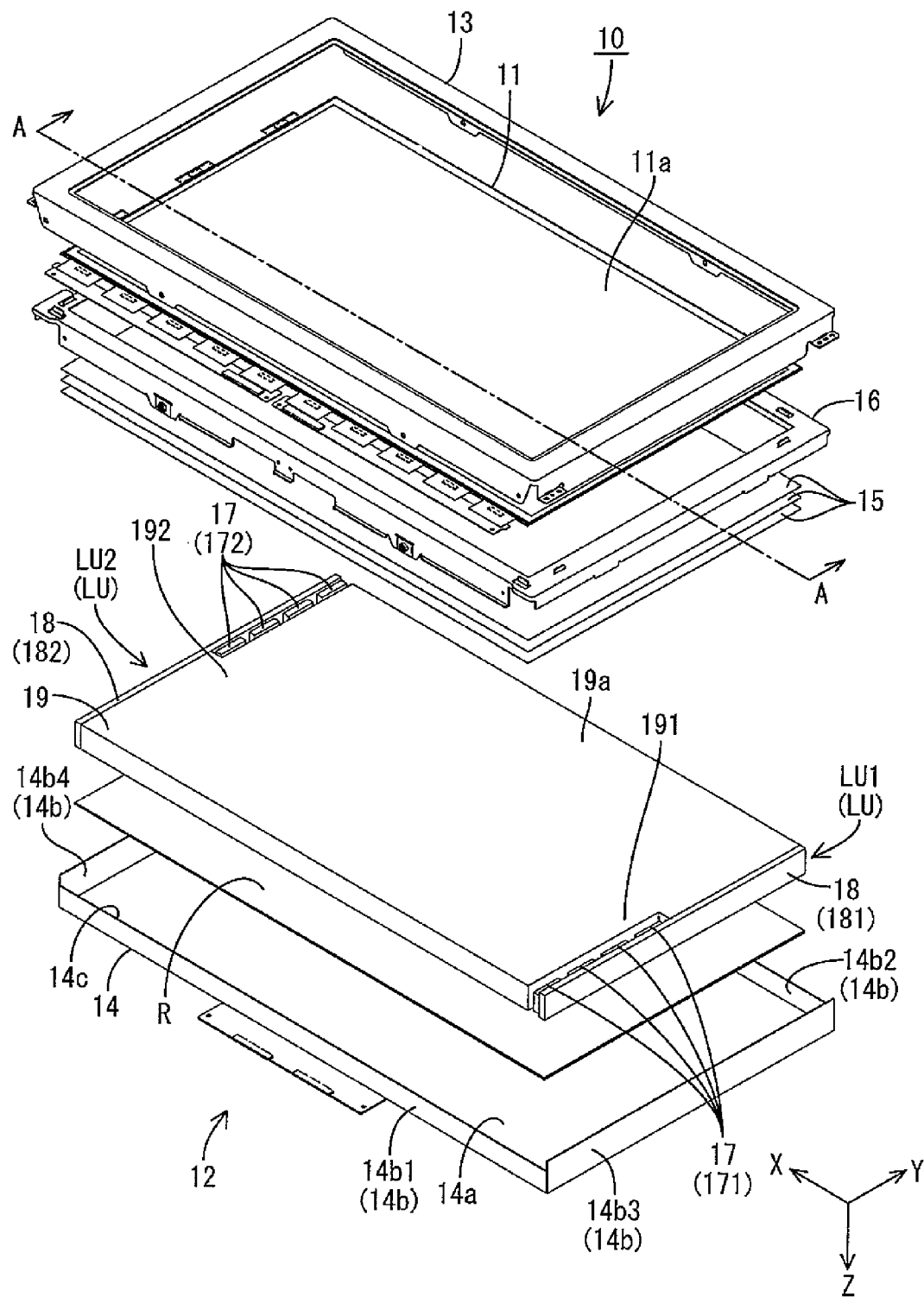
FIG. 2 is an exploded perspective view illustrating a schematic configuration of a liquid crystal display device in the television device.

FIG. 1 is an exploded perspective view illustrating a schematic configuration of the television device TV according to a first embodiment. As illustrated in FIG. 1, the television device TV includes the liquid crystal display device 10, front and rear cabinets Ca, Cb that hold the liquid crystal display device 10 therebetween, a power source P, a tuner T, and a stand S. The liquid crystal display device (a display device) 10 has a horizontally-long overall shape (a longitudinal shape). The liquid crystal display device 10 is held in the vertical position in the cabinets Ca, Cb. FIG. 2 is an exploded perspective view illustrating a schematic configuration of a liquid crystal display device 10 in the television device TV. As illustrated in FIG. 2, the liquid crystal display device 10 includes a liquid crystal panel 11, which is a display panel, and a backlight unit (a lighting unit) 12, which is an external light source. They are integrally held with a bezel 13 having a frame-like shape.

Figure 3:
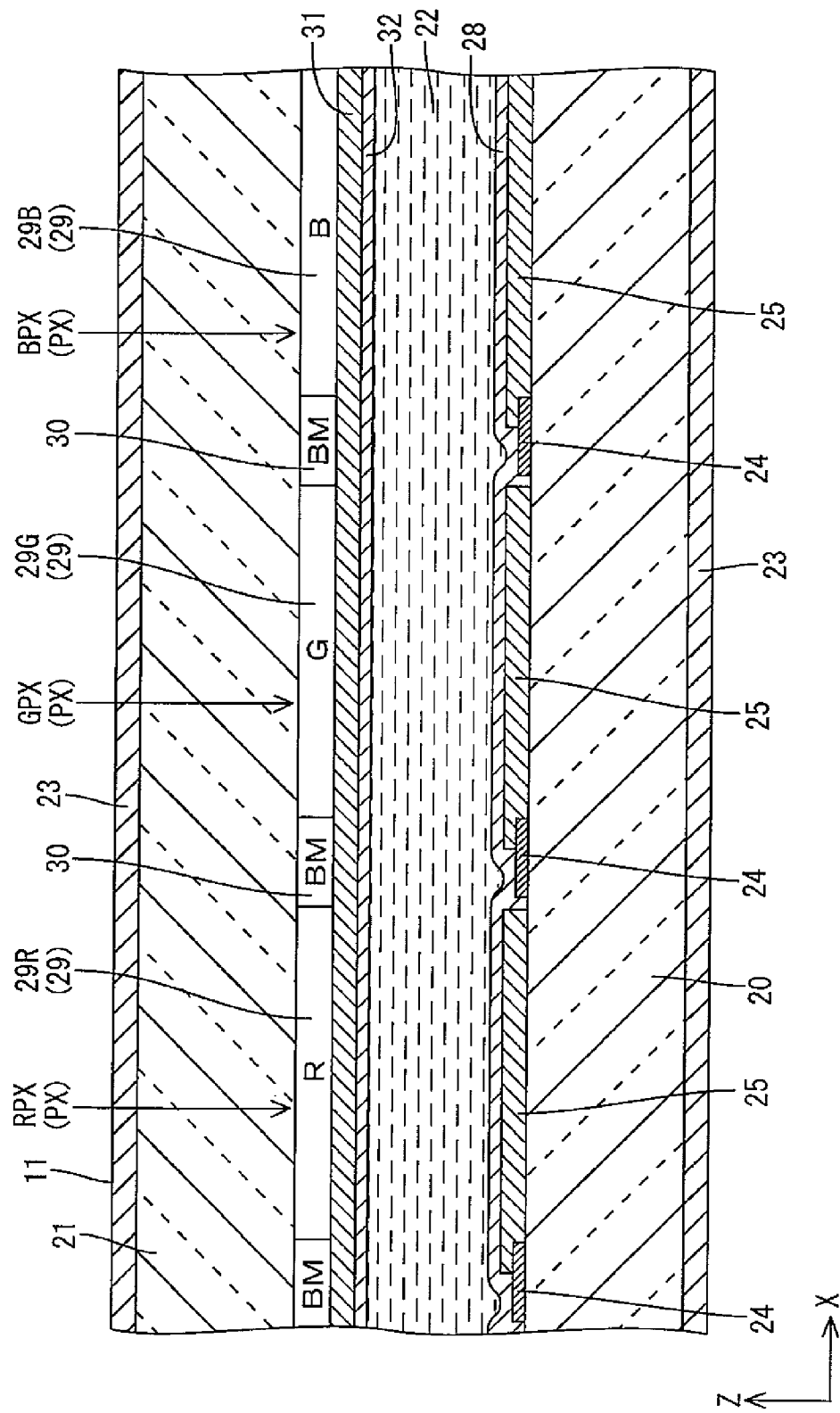
FIG. 3 is a cross-sectional view of a liquid crystal panel along the long-side direction thereof.

The liquid crystal panel 11 will be described. FIG. 3 is a cross-sectional view of a liquid crystal panel 11 along the long-side direction thereof. As illustrated in FIG. 3, the liquid crystal panel 11 includes a pair of transparent glass substrates 20, 21 (having light transmissivity) and a liquid crystal layer 22 sealed between the substrates 20, 21. The liquid crystal layer 22 includes liquid crystals having optical characteristics that change according to application of an electric filed. One of the substrates 20, 21 in the liquid crystal panel 11 on the rear side (on the backlight unit 12 side) is an array board (TFT board, active matrix board) 20. The other one of the substrates 20, 21 on the front side (on the light exit side) is a CF board (a counter board) 21. A pair of polarizing plates 23, one on the front and one on the rear, is provided. The polarizing plates 23 are attached to outer surfaces of the substrates 20, 21, respectively. Images appear on a front surface (a display surface) 11a of the liquid crystal panel 11 by irradiation of light from the backlight unit 12 on a rear surface 11b.

Figure 4:
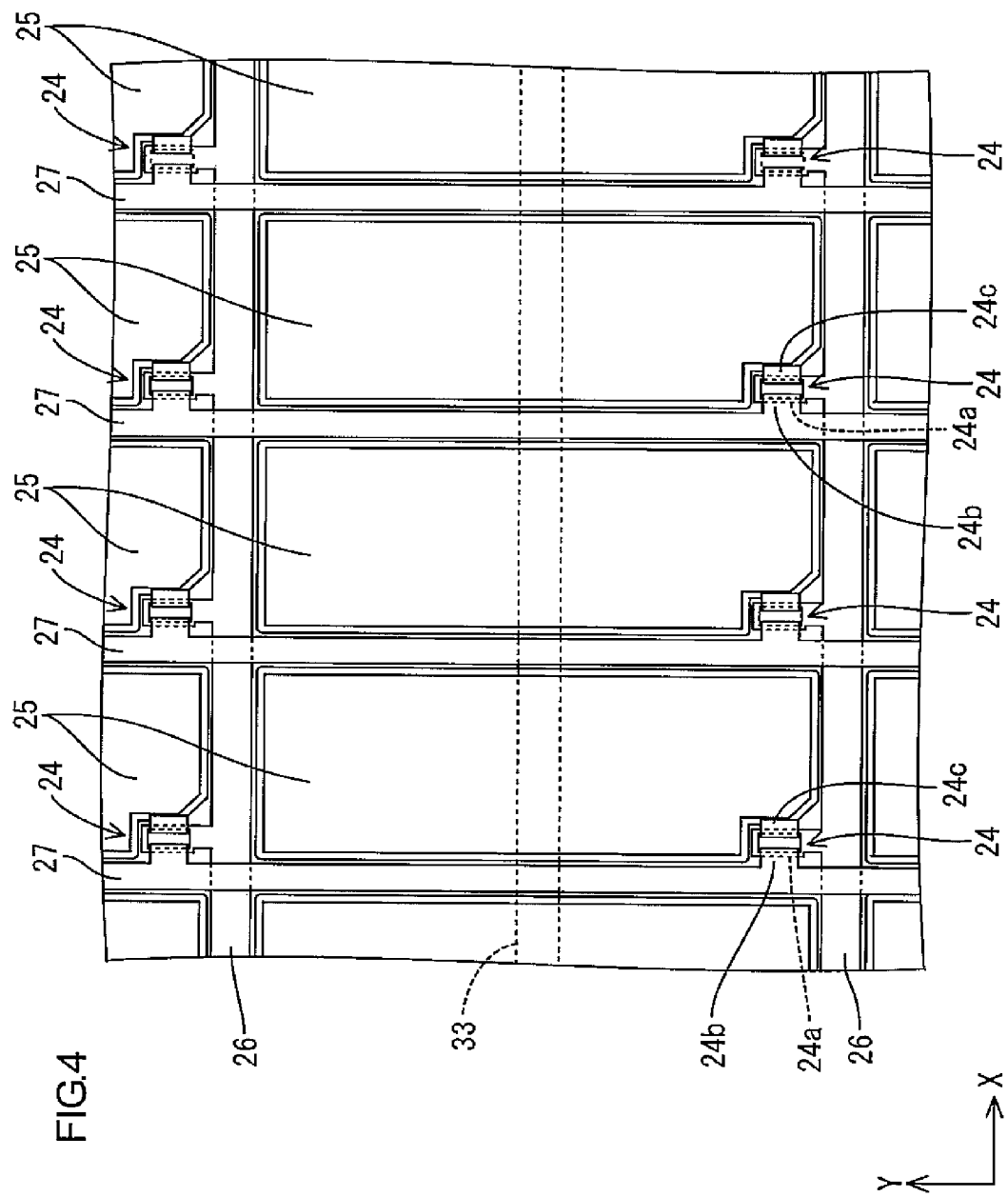
FIG. 4 is a magnified view of an array board illustrating a plan-view configuration.

FIG. 4 is a magnified view of an array board 26 illustrating a plan-view configuration. As illustrated in FIG. 4, on the inner surface of the array board 20 (on the liquid crystal layer 22 side, opposite to the CF board 21), a number of thin film transistors (TFTs) 24 and a number of pixel electrodes 25 are arranged in a matrix along a plate surface of the array board 20. The TFTs 24 are switching components. Each of the TFTs 24 includes three electrodes 24a to 24c. Furthermore, gate lines 26 and source lines 27 arranged around the TFTs 24 and the pixel electrodes 25 so as to form a grid. Each pixel electrode 25 is a transparent electrode made of indium tin oxide (ITO), for example. The gate lines 26 and the source lines 27 are made of electrical conducting material. The gate lines 26 and the source lines 27 are connected to gate electrodes 24a and source electrodes 24b of the respective TFTs 24. The pixel electrodes 25 are connected to drain electrodes 24c of the respective TFTs 24 via drain lines (not illustrated). The array board 20 includes capacitive lines (auxiliary capacitive lines, storage capacitive lines, Cs lines) 33. The capacitive lines 30 are arranged parallel to the gate lines 26 and overlap the pixel electrodes 25 in a plan view. The capacitive lines 33 are disposed alternately with the gate lines 26 with respect to the Y-axis direction. Each gate line 26 is disposed between the adjacent pixel electrodes 25 with respect to the Y-axis direction. Each of the capacitive lines 33 is disposed so as to cross the corresponding pixel electrodes 25 at about the middle of the Y-axis dimension of each of the corresponding pixel electrodes 25. Terminals that continue from the gate lines 26 and terminals that continue from the capacitive lines 33 are disposed in an edge portion of the array board 20. Signals or reference potentials are input from a panel controller on a control board, which is not illustrated, to the terminals. With the configuration, driving of the TFTs 24 arranged in the matrix is individually controlled. An alignment film 28 is formed on the inner surface of the array board 20 for alignment of liquid crystal molecules in the liquid crystal layer 22 (FIG. 3).

Figure 5:
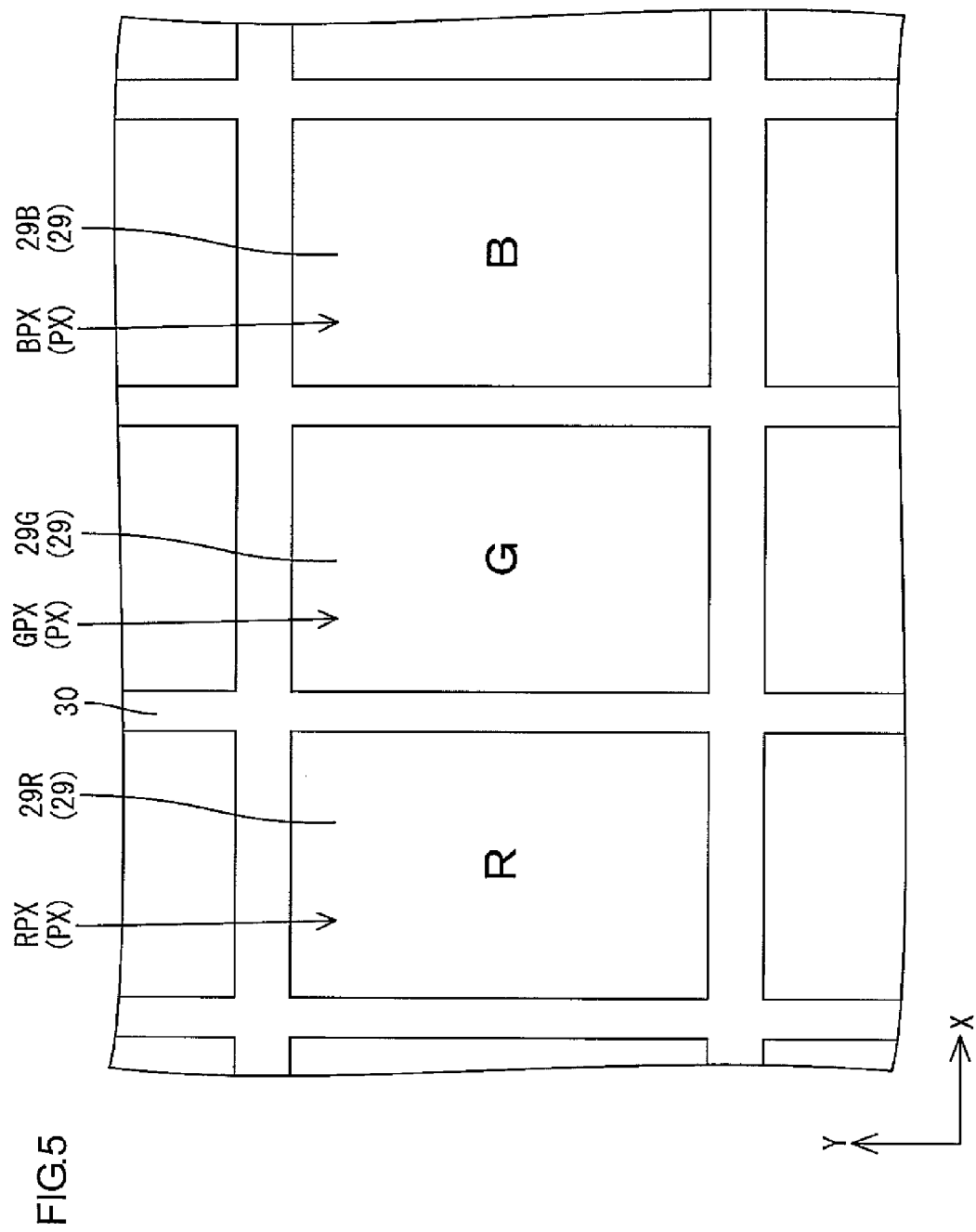
FIG. 5 is a magnified view of a CF board illustrating a plan-view configuration.

FIG. 5 is a magnified view of a CF board 21 illustrating a plan-view configuration. On the inner surface of the CF board 21 (on the liquid crystal layer 22 side, opposite to the array board 20), color filters 29 are arranged in a matrix along a plate surface of the CF board 21. The color filters 29 are disposed at positions that overlap the pixel electrodes 25 of the array board 20, as illustrated in FIGS. 3 and 5. The color filters 29 include color portions 29R, 29G, 29B that represent red, green, and blue, respectively. The color portions 29R, 29G, 29B are arranged in repeated sequence along the row direction (the X-axis direction) to form a group of color portions. A multiple groups of the color portions 29R, 29G, 29B are arranged along the column direction (the Y-axis direction). The color portions 29R, 29G, 29B in the color filters 29 selectively pass the respective colors (or wavelengths) of light therethrough. Each of the color portions 29R, 29G, 29B has a rectangular overall shape similar to an overall shape of each pixel electrode 25 as illustrated in FIG. 5. A light blocking portion (a black matrix) 30 is formed in a grid-like shape among the color portions 29R, 29G, 29B for reducing mixture of colors. The light blocking portion 30 is disposed so as to overlap the gate lines 26, source lines 27, and the capacitive lines 33 of the array board 20 in a plan view. As illustrated in FIG. 3, a counter electrode 31 is disposed so as to oppose the pixel electrodes 25 of the array board 20. An alignment film 32 is formed on the inner surface of the CF board 21 for alignment of the liquid crystal molecules in the liquid crystal layer 22.

As illustrated in FIGS. 3 to 5, in the liquid crystal panel 11, a unit pixel PX includes the R, G and B color portions 29R, 29G, 29B for three different colors and three pixel electrodes 25 opposite the color portions 29R, 29G, 29B, respectively. The unit pixel PX is a unit of display. A number of unit pixels PX each having such a configuration are disposed in a matrix on the plate surfaces of the substrates 11a, 11b along a display surface (X-Y plane). Each unit pixel PX includes a red pixel RPX, a green pixel GPX, and a blue pixel BPX. The red pixel RPX includes the red color portion 29R. The green pixel GPX includes the green color portion 29G. The blue pixel BPX includes the blue color potion 29B. The red pixels RPX, the green pixels GPX, and the blue pixels BPX in the unit pixels PX are disposed in repeated sequence along the row direction (the X-axis direction) and form groups of pixels. A number of the groups of pixels are disposed along the column direction (the Y-axis direction). Driving of each TFT 24 in each pixel RPX, GPX, BPX is controlled by the panel controller. Each pixel electrode 25 is connected to the corresponding TFT 24. When the panel controller controls driving of the TFT 24 of each pixel RPX, GPX, BPX and a predetermined voltage is applied between the pixel electrode 25 and the counter electrode 31, an orientation state of the liquid crystal layer 22 between the pixel electrode 25 and the counter electrode 31 changes according to the voltage. An amount of light that passes through each color portion 29R, 29G, 29B is individually controlled.

Next, the backlight unit 12 will be described in detail. As illustrated in FIG. 2, the backlight unit 12 includes a chassis 14, a frame 16, LED units (light source units) LU, and a light guide plate 19. The chassis 14 has a box-like shape and includes a light exiting portion 14c with an opening on the front side, that is, on a light emitting side (a liquid crystal panel 11 side). An optical member 15 is disposed so as to cover the light exiting portion 14c of the chassis 14. The frame 16 holds down the optical member 15 and the light guide plate 19, which will be described later, from the front side. Furthermore, the LED unit LU includes light emitting diodes (LEDs) 17 that are light source and an LED board (a light source board 9 18 on which the LEDs 17 are mounted. The light guide plate 19 is configured to guide light from the LEDs 17 to the optical member 15 (toward the liquid crystal panel 11, toward the light exiting side).

Figure 6:
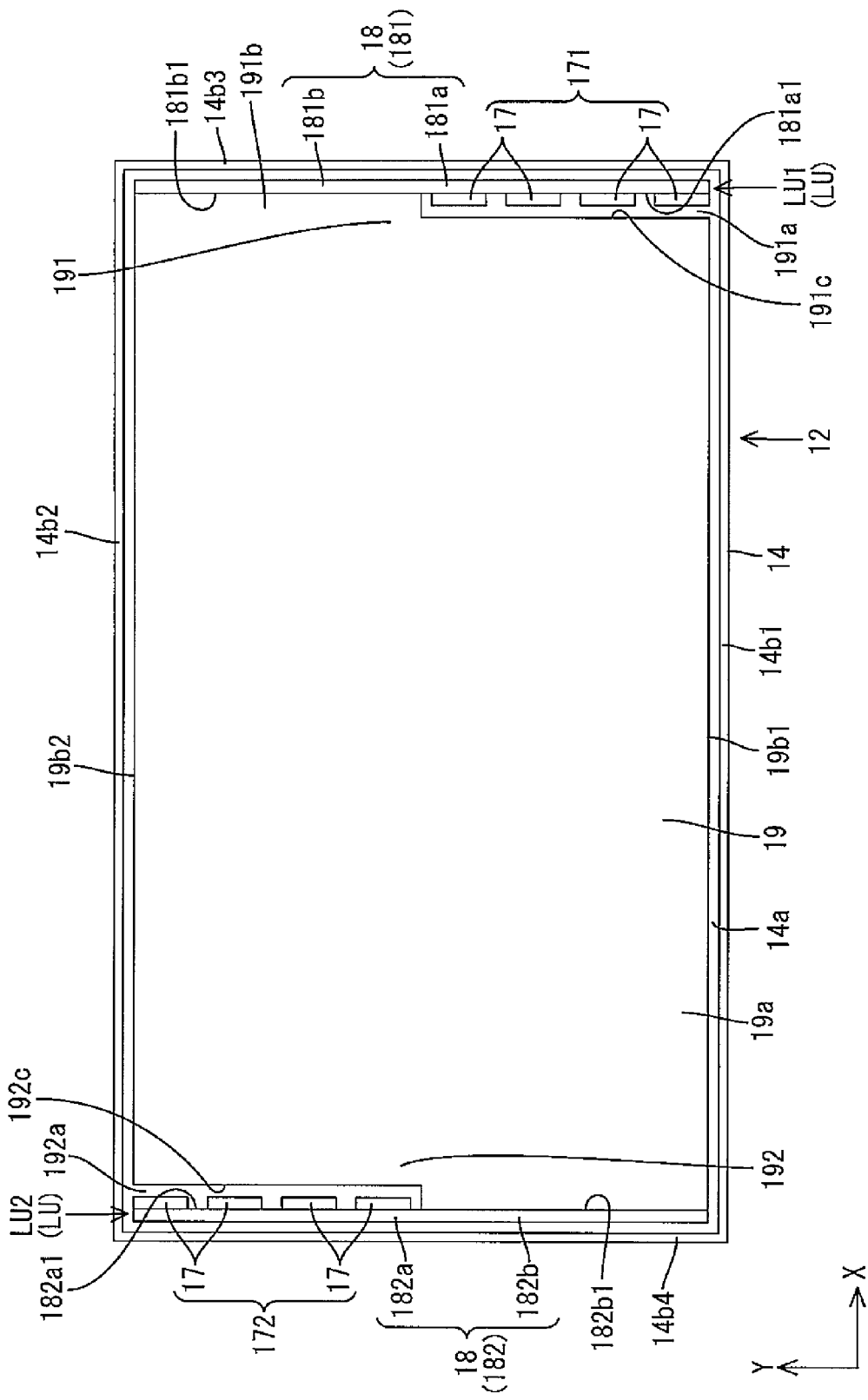
FIG. 6 is a plan view illustrating arrangement of a chassis, a light guide plate, and LED units.
Figure 7:
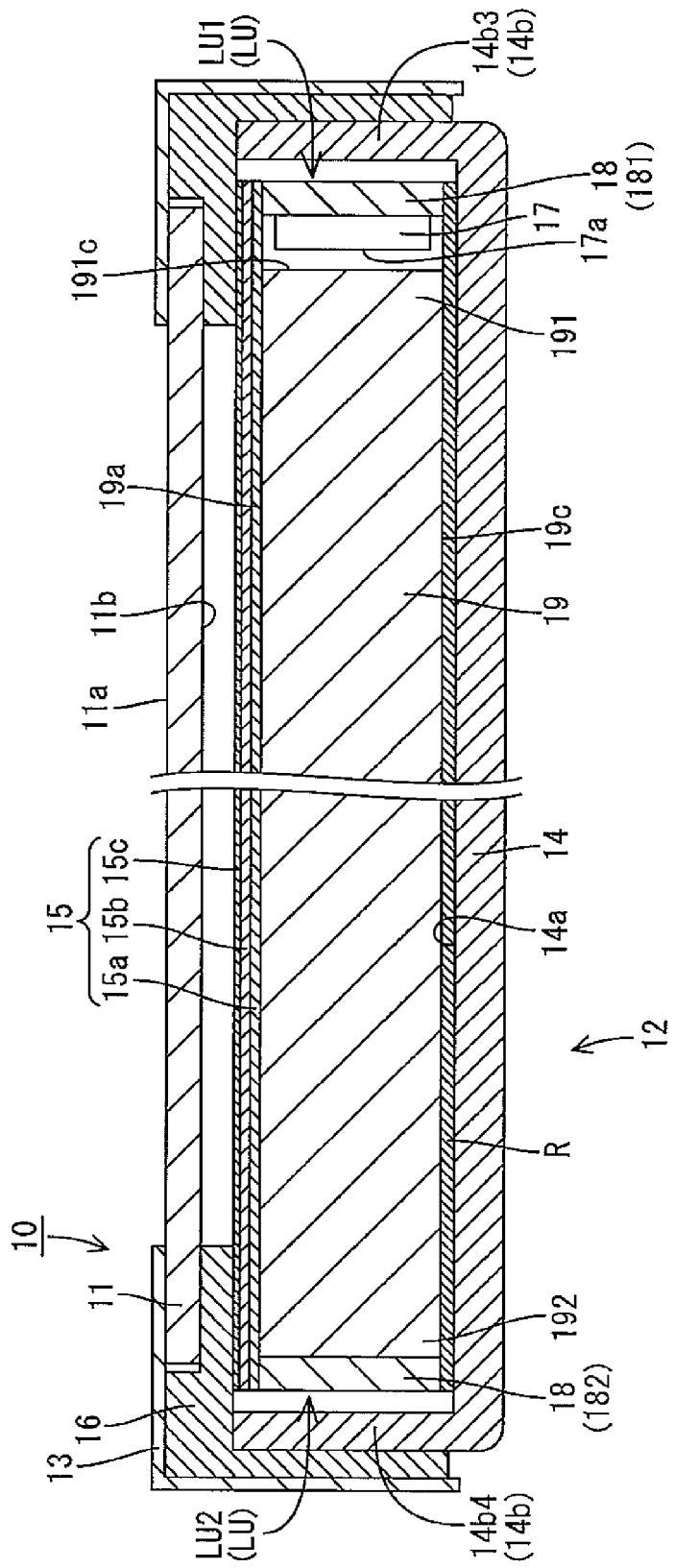
FIG. 7 is a cross-sectional view along line A-A in FIG. 2.

In the backlight unit 12, the LED unit LU is disposed at each of short edges of the backlight unit 12 and light enters the light guide plate 19 through the short side edges. The backlight unit 12 in this embodiment is an edge light type in which light enters the light guide plate 19 through two sides of the light guide plate 19. Namely, the backlight unit 12 of this embodiment is a double-edge light entering type. Components of the backlight unit 12 will be described in detail below. FIG. 6 is a plan view illustrating an arrangement relation of the chassis 14, the light guide plate 19 and the LED units LU included in the backlight unit 12. FIG. 7 is a cross-sectional view along line A-A in FIG. 2.

The chassis 14 is formed from a metal plate, which may be an aluminum plate or an electro galvanized steel plate (SECC), and processed into a shape of a shallow box. As illustrated in FIG. 2, the chassis 14 includes a bottom plate 14a and side plates 14b. The bottom plate 14a has a horizontally-long rectangular shape similar to the liquid crystal panel 11. The side plates 14b project from respective outer edges of the bottom plate 14a (a pair of long edges and a pair of short edges) toward the front side. The side plates projecting from the pair of long edges may be referred to as side plates 14b1, 14b2 and the side plates projecting from the pair of short edges may be referred to as side plates 14b3, 14b4. The chassis 14 (the bottom plate 14a) is oriented such that the long-side direction and the short-side direction thereof correspond with the X-axis direction and the Y-axis direction, respectively. Boards including a control board and an LED driver board are mounted on the back surface of the bottom plate 14a. The frame 16 and the bezel 13 are fixable to the side plates 14b with screws.

As illustrated in FIG. 2, the optical member 15 has a horizontally-long rectangular shape in a plan view similar to the liquid crystal panel 11 and the chassis 14. The optical member 15 is placed on the front surface of the light guide plate 19 (on the light exiting side) between the liquid crystal panel 11 and the light guide plate 19 in the backlight unit 12. With this configuration, the optical member 15 passes light from the light guide plate 19 therethrough while adding a specific optical property to the light, and direct the light toward the liquid crystal panel 11. The optical member 15 is a multilayered member including multiple sheet-like members (three of them in this embodiment). Examples of the sheet-like members include a diffuser sheet 15a, a lens sheet 15b, and a reflection-type polarizing sheet 15c. The sheet-like members may be selected from those as appropriate.

As illustrated in FIG. 2, the frame 16 has a sash-like shape (a picture frame-like shape) which extends along outer edges of the light guide plate 19. The frame 16 can press down the outer edges of light guide plate 19 for substantially an entire perimeter from the front side. The frame 16 is made of synthetic resin. The frame 16 includes a black surface, that is, has a light blocking property. The frame 16 is placed on an upper edge side of the side plates 14 of the chassis 14 having the light guide plate 19 therein. The frame 16 is configured to receive the outer peripheral edge portion of the liquid crystal panel 11 from the rear side.

As illustrated in FIGS. 2, 6 and 7, the LED units LU that are in pair (one set) to be opposite each other with sandwiching the light guide plate 19 therebetween. The LED unit LU is arranged on each of the short side edges of the light guide plate 19 in the backlight unit 12. One of the LED units LU near the side plate 14b3 of the chassis 14 is referred to as a first LED unit (a first light source unit) LU1 and the one near the side plate 14b of the chassis is referred to as a second LED unit (a second light source unit) LU2.

The first LED unit LU1 includes an elongated LED board 18 and a first LED group (a first light source group) 171 including LEDs 17 (four LEDs in this embodiment) that are arranged in a row. The LED board 18 included in the first LED unit LU1 is referred to as a first board 181. The first board 181 has a plate-like shape (a belt-like shape) elongated along the short side of the light guide plate 19. The first board 181 includes a first mount portion 181a and a first empty portion 181b that is next to the first mount portion 181a. The LEDs 17 included in the first LED group 171 are mounted on the first mount portion 181a.

The second LED unit LU2 includes an elongated LED board 18 and a second LED group (a second light source group) 172 including LEDs 17 (four LEDs in this embodiment) that are arranged in a row. The LED board 18 included in the second LED unit LU2 is referred to as a second board 182. The second board 182 has a plate-like shape (a belt-like shape) elongated along the short side of the light guide plate 19. The second board 182 includes a second mount portion 182a and a second empty portion 182b that is next to the first mount portion 182a. The LEDs 17 included in the second LED group 172 are mounted on the second mount portion 182a.

The first LED unit LU1 and the second LED unit LU2 basically have the same configuration. As illustrated in FIGS. 2 and 7, the first LED unit LU1 and the second LED unit LU2 are arranged to be opposite each other with having the light guide plate 19 therebetween. However, the LEDs 17 mounted on the first LED unit LU1 are not opposite the LEDs 17 mounted on the second LED unit LU2.

If the light guide plate 19, which has a rectangular plan view shape, is defined into two parts along the long side thereof, one part of the light guide plate 19 (a part near the side plate 14b1, a lower part of the light guide plate 19 in FIG. 6) is supplied with light from the LEDs 17 of the first LED unit LU1 (the first LED group 171), and another part of the light guide plate 19 (a part near the side plate 14b2, an upper part of the light guide plate 19 in FIG. 6) is supplied with light from the LEDs 17 of the second LED unit LU2 (the second LED group 172).

In this embodiment, the first LED unit LU1 and the second LED unit LU2 are fixed to the light guide plate 19 such that the first mount portion 181a of the first LED unit LU1 is opposite the second empty portion 182b of the second LED unit LU2, and the second mount portion 182a of the second LED unit LU2 is opposite the first empty portion 181b of the first LED unit LU1. The first LED unit LU1 and the second LED unit LU2 are arranged such that the portions thereof having the LEDs 17 (the first mount portion 181a and the second mount portion 182a) are arranged in a staggered arrangement. Therefore, the LEDs 17 (the first LED group 171) on the first LED unit LU1 are located near the side plate 14b1 of the chassis 14 and the LEDs 17 (the second LED group 172) on the second LED unit LU2 are located near the side plate 14b2 of the chassis 13.

Namely, the backlight unit 12 of this embodiment is a double-edge light entering type. However, the light entrance surfaces (a light entrance surface, a light entrance portion) of the light guide plate 19 are not overlapped. The LEDs 17 of the first LED group 171 included in the first LED unit LU1 are arranged in a line at equal intervals on the first mount portion 181a. The LEDs 17 of the second LED group 172 included in the second LED unit LU2 are arranged in a line at equal intervals on the second mount portion 182a. Each interval between the LEDs 17 of the first LED group 171 is same as each interval between the LEDs 17 of the second group 172. An interval between the first LED group 171 and the second LED group is same as the interval between the LEDs 17. Namely, the LEDs 17 included in the first LED group 171 and the LEDs 17 included in the second group 172 emit light indifferent directions. However, the LEDs 17 are entirely arranged at equal intervals and along the short side of the light guide plate.

In this embodiment, the first board 181 and the second board 182 have the same length that is equal to a length of the short side of the light guide plate 19. The first board 181 is defined into two parts including the first mount portion 181a and the first empty portion 181b with respect to the longitudinal direction thereof (the short side direction of the light guide plate). The second board 182 is defined into two parts including the second mount portion 182a and the second empty portion 182b with respect to the longitudinal direction (the short side direction of the light guide plate 19).

As will be described later, the first empty portion 181b of the first LED unit LU1 and the second empty portion 182b of the second LED unit LU2 are directly fixed to the edge portions of the light guide plate 19.

As illustrated in FIGS. 2 and 7, the LEDs 17 are surface-mounted on the LED board 18. Each LED 17 includes a light emitting surface 17a facing the opposite direction from the LED board 18, that is, the LED 17 is a top surface emitting-type light emitting diode. Specifically, the LED 17 includes an LED element (an LED chip, a light emitting element), a sealing member (a light transmissive resin member), and a case (a container, a housing). The LED element is a light emitting source. The sealing member seals the LED element. The case holds the LED element therein and the case is filled with the sealing member. The LEDs 17 of this embodiment are configured to emit white light.

As illustrated in FIGS. 2 and 6, the LED board 18 included in the LED unit LU is an elongated plate extending in the short-side direction (the Y-axis direction) of the light guide plate 19. The LED board 18 that is fixed to the light guide plate 19 is arranged in the chassis 14 with the plate surface thereof being parallel to a Y-Z plane (namely, perpendicular to the plate surfaces of the liquid crystal panel 11 and the light guide plate 19). The LED boards 18 are illustrated in the drawings such that the long-side direction thereof matches the Y-axis direction, the short-side direction thereof matches the Z-axis direction, and the plate thickness direction that is perpendicular to the plate surface matches the X-axis direction.

The portion of each LED board 18 where the LEDs 17 are mounted (the first mount portion 181a of the first LED unit LU1, the second mount portion 182a of the second LED unit LU2) is opposite one part of the short side edge surface of the light guide plate 19 and the portion of each LED board 18 where no LED 17 is mounted (the first empty portion 181b of the first LED unit LU1 and the second empty portion 182b of the second LED unit LU2) is fixed to another part of the short side edge surface of the light guide plate 19 with being closely adhered thereto. Thus, the LED boards 18 are directly mounted on the light guide plate 19. Each of the LEDs 17 mounted on the LED boards 18 have optical axes that match the X-axis direction (the long-side direction of the light guide plate 19, the X-axis direction).

The LED board 18 is a single side mounting-type, that is, only one of the plate surfaces is the mounting surface, and the wiring pattern (not illustrated) is formed on mounting surfaces (a mounting surface 181a1 of the first mount portion 181a, a mounting surface 182a1 of the second mount portion 182a, see FIG. 6) of the LED boards 18. The wiring pattern is formed from a metal film (e.g., a copper foil). The wiring pattern extends along the Y-axis direction. The wiring pattern crosses the LEDs 17 (the first LED group 171, the second LED group 172) and connects the LEDs 17 in series. A backlight controller included in a LED driver circuit board (not illustrated) is electrically connected to terminals formed at ends of the wiring pattern through wiring members. With this configuration, driving power is supplied from the backlight controller to the LEDs 17 of the LED units LU.

A base material of the LED boards 18 is a metal plate, for example, an aluminum plate. The wiring pattern (not illustrated) is formed on the surface of the LED board 18 via an insulating layer. An insulting material such as synthetic resin material and a ceramic material may be used for the LED board 18.

A double-sided tape is adhered to a surface (a plate surface) of the empty portion where no LED 17 is mounted. The empty portion of each LED board 18 is adjacent to the mounting surface (the mounting surface 181a1 of the first mount portion 181a, the mounting surface 182a1 of the second mount portion 182a). The LED boards 18 are bonded to the edge surfaces of the light guide plate 19 via the double-sided tapes.

The LED board 18 of the first LED unit LU1 (namely, the first board 181) includes the first empty portion 181b having the surface 181b1 that is covered with a double-sided tape. The first empty portion 181b is bonded to a part of one short edge surface of the light guide plate 19 via the double-sided tape so that the first LED unit LU1 is fixed to the light guide plate 19. The LED board 18 of the second LED unit LU2 (namely, the second board 182) includes the second empty portion 182b having the surface 182b1 that is covered with a double-sided tape. The second empty portion 182b is bonded to a part of another short edge surface of the light guide plate 19 via the double-sided tape so that the second LED unit LU2 is fixed to the light guide plate 19. Namely, the first empty portion 181b is a fixed portion (a first fixed portion) with which the first LED unit LU1 is fixed to the light guide plate 19, and the second empty portion 182b is a fixed portion (a second fixed portion) with which the second LED unit LU2 is fixed to the light guide plate 19.

The light guide plate 19 is made of synthetic resin (e.g., acrylic) having a refractive index sufficiently higher than that of the air and substantially transparent (having high light transmissivity). As illustrated in FIGS. 2 and 6, the light guide plate 19 has a horizontally-long rectangular plate-like shape in a plan view similar to the liquid crystal panel 11 and the bottom plate 14a of the chassis 14. A long-side direction and a short-side direction of the plate surface of the light guide plate 19 correspond with the X-axis direction and the Y-axis direction, respectively. A thickness direction of the light guide plate 19 perpendicular to the plate surface corresponds with the Z-axis direction.

As illustrated in FIG. 7, the light guide plate 19 is disposed under the liquid crystal panel 11 and the optical member 15 inside the chassis 14. The long side edge portions of the light guide plate 19 extend substantially straight. The short side edge portions of the light guide plate 19 have recess portions formed by cutting off a part of each short side edge portion. A short-side edge portion 191 of the light guide plate 19 where the first LED unit LU1 is fixed has a recess portion formed by cutting off a part thereof near the side plate 14b1 of the chassis 14 and has a projection near the side plate 14b2 that is opposite from the side plate 14b1, the projection projecting toward the outer side (toward the side plate 14b3). The recess of the edge portion 191 is a first arrangement portion 191a where the first LED group 171 of the first LED unit LU1 is arranged and the projection adjacent to the first arrangement portion 191a is a first fixing portion 191b where the first empty portion 181b of the first LED unit LU1 is fixed.

A short side edge portion 192 of the light guide plate 19 where the second LED unit LU2 is fixed has a projection where a part thereof near the side plate 14b1 toward the outer side (toward the side plate 14b4) and has a recess portion formed by cutting off a part thereof near the side plate 14b2. The recess of the edge portion 192 is a second arrangement portion 192a where the second LED group 172 of the second LED unit LU2 is arranged and the projection adjacent to the second arrangement portion 192a is a second fixing portion 192b where the second empty portion 182b of the second LED unit LU2 is fixed.

As illustrated in FIGS. 2 and 6, the first arrangement portion 191a and the second arrangement portion 192a formed in the short side edge portions of the light guide plate 19 are not overlapped with each other with respect to the long side direction of the light guide plate 19. Namely, the first arrangement portion 191a and the second arrangement portion 192a are arranged in a staggered arrangement. The light guide plate 19 receives rays of light from the LEDs 17 along the X-axis direction through the short side edge surfaces 191, 192. The light guide plate 19 passes the rays of light therethrough and directs the rays of light to exit from the plate surface and toward the optical member 15 (toward the front side, toward the light exiting side).

The plate surface of the light guide plate 19 having a plate-like shape facing the front side (the surface opposed to the liquid crystal panel 11 and the optical member 15) is a light exit surface (a light exit portion) 19a. The light exit surface 19a is a surface through which the rays of light from the inside of the light guide plate 19 toward the optical member 15 and the liquid crystal panel 11.

The short side edge portion 191 of the light guide plate 19 has an edge surface that includes the first arrangement portion 191a and is opposed to the LEDs 17 of the first LED group 171. The edge surface is defined as a light entrance surface (a first light entrance portion) 191c through which light from the LEDs 17 of the first LED unit LU1 enters. The light entrance surface 191c is elongated in the short-side direction of the light guide plate 19 and extends along a Y-Z plane. The light entrance surface 191c is opposite the LEDs 17 of the first LED group 171 with a gap (a clearance) therebetween.

The short side edge portion 192 of the light guide plate 19 has an edge surface that includes the second arrangement portion 192a and is opposed to the LEDs 17 of the second LED group 172. The edge surface is defined as a light entrance surface (a second light entrance portion) 192c through which light from the LEDs 17 of the second LED unit LU2 enters. The light entrance surface 192c is elongated in the short-side direction of the light guide plate 19 and extends along a Y-Z plane similar to the light entrance surface 191c. The light entrance surface 192c is opposite the LEDs 17 of the first LED group 171 with a gap (a clearance) therebetween.

Namely, the light guide plate 10 includes two light entrance surfaces (the first light entrance portion and the second light entrance portion) 191c, 192c. The light entrance surfaces 191c, 192c are included in the facing short side edge portions 191, 192, respectively. The light guide plate 19 includes the light entrance surface 191c and the light entrance surface 192c so as not to be overlapped with each other with respect to the long-side direction of the light guide plate 19 (an optical axis direction of the LED 17). The light entrance surfaces 191c, 192c are substantially perpendicular to the light exit surface 19a.

The light guide plate 19 includes long-side edge surfaces 19b1, 19b2 that are opposite the long-side plates 14b1, 14b2, respectively.

Figure 8:
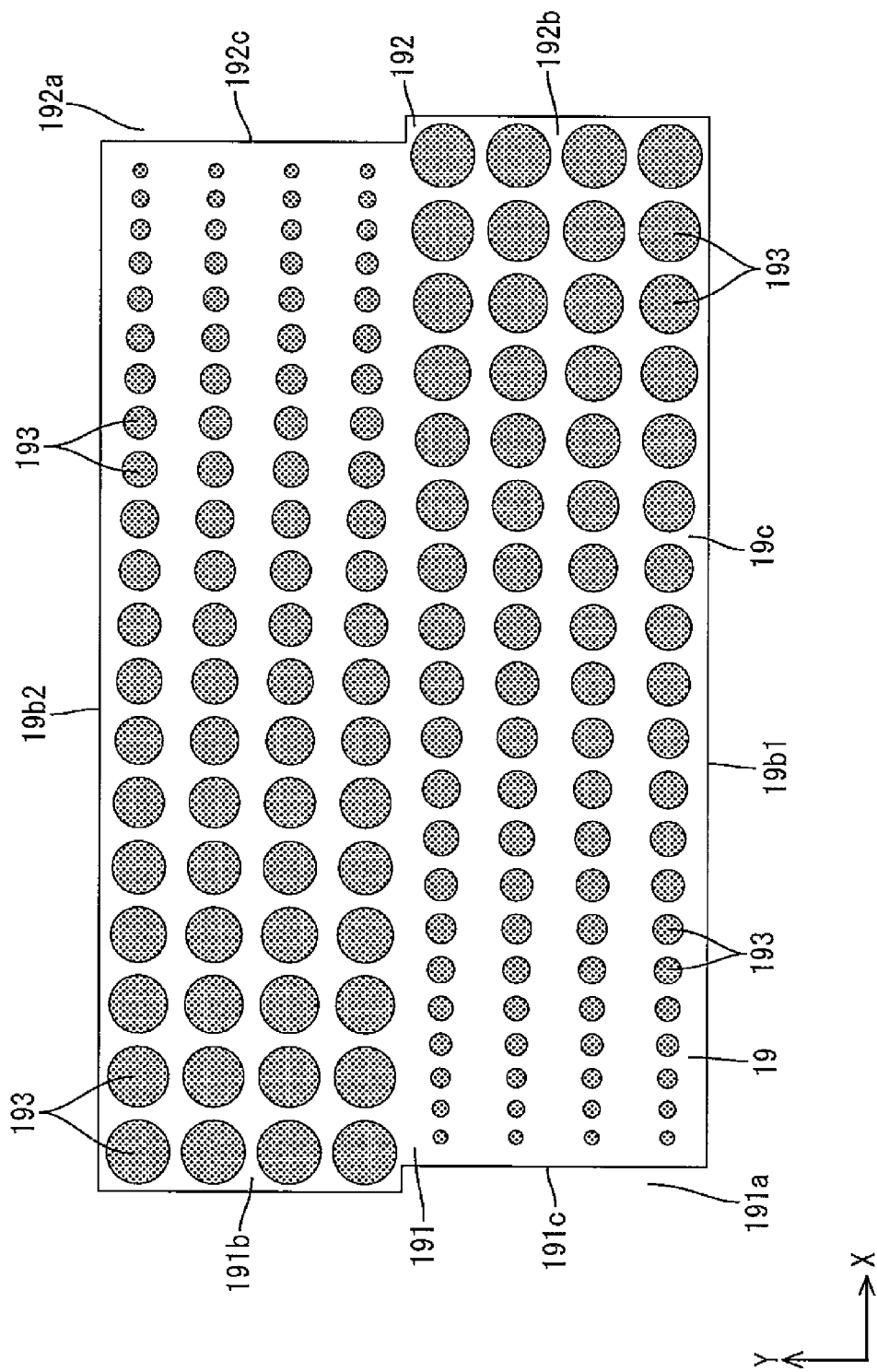
FIG. 8 is a plan view illustrating light reflection/scattering portions formed on the rear surface of the light guide plate.

On one (a rear plate surface) 19c of plate surfaces of the light guide plate 19 that is opposite from the light exit surface 19a, light reflection/scattering portions are patterned with a predetermined in-plane distribution. Light traveling within the light guide plate 19 is reflected and scattered by the light reflection/scattering portions. FIG. 8 illustrates light reflection/scattering portions 193 on the rear surface 19c of the light guide plate 19. The light reflection/scattering portions 193 are coated films formed on the plate surface (the rear surface) 19c. The coated films are formed by coating paint containing white pigments on the plate surface in dots with using printing technique such as silk printing. The light reflection/scattering portions are patterned such that a size of the dots of the light reflection/scattering portions 193 increases as is farther away from the light entrance surface 191c and closer to the second fixing portion 192b with respect to the long-side direction of the light guide plate 19. The size of the dot pattern of the light reflection/scattering portions 193 is smaller near the light entrance surfaces 191c, 192c that receive sufficient amount of light and the size of the dot pattern of the light reflection/scattering portions 193 is greater as is farther away from the light entrance surfaces 191c, 192c. In another embodiment, the light reflection/scattering portions may not be formed by coating films but may be formed with emboss processing.

As illustrated in FIGS. 2 and 7, a reflection sheet R is disposed in the chassis 14 to cover the rear plate surface (the rear surface) 19c of the light guide plate 19. The reflection sheet R also has a horizontally-long rectangular shape similar to the light guide plate 19 and the liquid crystal panel 11 and is disposed in the chassis 14 to cover the bottom plate 14a. The reflection sheet is made of a white expandable plastic sheet (expandable polyethylene terephthalate sheet). Light travelling within the light guide plate 19 is reflected by the reflection sheet R and directed toward the front side. The reflection sheet R covers an entire area of the plate surface 19c of the light guide plate 19. The reflection sheet R is sandwiched between the light guide plate 19 and the bottom plate 14a within the chassis 14.

The chassis 14 includes stopper pins (not illustrated) projecting from the bottom plate 14a. The light guide plate 19 includes stopper holes (not illustrated) through which the stopper pins are inserted from the rear side (the plate surface 19c side) toward the front side (the light exit surface 19a side). The stopper pins are inserted in the stopper holes so that the light guide plate 19 is positioned in a predetermined position within the chassis 14. In this embodiment, the stopper pins project from middle portions of the long-side edge portions of the bottom plate 14a and the stopper holes are in middle portions of the long-side edge portions of the light guide plate 19. The reflection sheet R also includes stopper holes or stopper cut off recesses where the stopper pins are put in. The reflection sheet R is also positioned within the chassis 14 with using the stopper pins.

The liquid crystal panel 11 that is sandwiched between the frame 16 included in the backlight unit 12 and the bezel 13 that is put on the frame 15 from the front side is mounted on the chassis 14.

In the liquid crystal display device 10 having the above configuration, the LEDs 17 of the LED units LU included in the backlight unit (the lighting unit) 12 emit light (are tuned on) to appear images on the display surface 11a of the liquid crystal panel 11. The light emitted by the LEDs 17 enters the light guide plate 19 through the light entrance surfaces 191c, 192c of the light guide plate 19. The light entering the light guide plate 19 reflects off the reflection sheet R disposed on the rear side of the light guide plate 19 and the light reflection/scattering portions 193 formed on the rear surface 19c of the light guide plate 19 and travels within the light guide plate 19. Then, the light exits the light guide plate 19 through the light exit surface 19a that is a front-side plate surface of the light guide plate 19. The light exiting the light guide plate 19 through the light exit surface 19a passes through the optical member 15 and is converted to planar light. Thus, the rear surface 11b of the liquid crystal panel 11 is irradiated with the planar light and images appear on the display surface 11a of the liquid crystal panel 11 with using the light from the backlight unit 12.

As described before, in the backlight unit 12 of this embodiment, a pair of LED units LU (the first LED unit LU1 and the second LED unit LU2) is directly fixed to the light guide plate 19. Therefore, the LED units LU that are previously mounted on the light guide plate 19 are easily mounted on a predetermined position within the chassis.

In the backlight unit 12 of this embodiment, the gap (the distance) between each of the light entrance surfaces (the first light entrance portion, the second light entrance portion) 191c, 192c of the light guide plate 19 is previously set to a certain value. For example, the gap between the LEDs 17 of the first LED unit LU1 and the light entrance surface (the first light entrance portion) 191*c* is changed by adjusting a length of the projected first fixing portion 191*b* of the edge portion 191 of the light guide plate 19 (a length of the projected portion projecting from the light entrance surface 191*c* toward the outer side). The gap between the LEDs 17 of the second LED unit LU2 and the light entrance surface (the second light entrance portion) 192*c* is changed by adjusting a length of the projected second fixing portion 192*b* of the edge portion 192 of the light guide plate 19 (a length of the projected portion projecting from the light entrance surface 192*c* toward the outer side).

In the backlight unit 12 of this embodiment, the LED units LU are directly fixed to the respective edge portions 191, 192 of the light guide plate 19. With this configuration, if the light guide plate 19 thermally expands and the edge portions 191, 192 move, the LED units LU also move with the edge portions 191, 192. Therefore, even if the light guide plate 19 thermally expands and changes the positions of the edge portions, the light entrance efficiency of light entering the light guide plate 19 through the light entrance surfaces 191*c*, 192*c* is less likely to be lowered. Further, even if the light guide plate 19 thermally expands and changes the positions of the edge portions, the light entrance surfaces 191*c*, 192*c* or the LEDs 17 are less likely to be damaged by contact between the light entrance surfaces 191*c*, 192*c* and the LEDs 17.

In the backlight unit 12 of this embodiment, the first LED unit LU1 is fixed to the fixing portion (the first fixing portion) 191*b* of the light guide plate 19 with using the first empty portion 181*b* and the second LED unit LU2 is fixed to the fixing portion (the first fixing portion) 192*b* of the light guide plate 19 with using the second empty portion 182*b*. Namely, the LED units LU are fixed to the respective edge portions 191, 192 of the light guide plate 19 (specifically, the first fixing portion 191*b*, the second fixing portion 192*b*) with using the portions thereof having no LEDs 17. With such a fixing configuration, the light entering the light guide plate 19 through the light entrance surfaces 191*c*, 192*c* is not blocked, and the light entrance efficiency of light entering the light entrance surfaces 191*c*, 192*c* is less likely to be lowered.

In the backlight unit 12 of this embodiment, unlike the related art, it is not necessary to provide the support member between the adjacent LEDs 17 to fix the LED units LU to the light guide plate 19. In the backlight unit 12 of this embodiment, the LEDs 17 included in the first LED group 171 of the first LED unit LU1 can be arranged at small intervals. Other components such as the support members are not arranged between the adjacent LEDs 17 and therefore, rays of light from the backlight unit 12 are less likely to have partially a small amount of light (uneven brightness).

In the backlight unit 12 of this embodiment, the LEDs 17 are not arranged in an entire area of each LED board 18 of each LED unit LU along a longitudinal direction of the LED board 18 but are arranged in a half area of each LED board 18 with respect to the longitudinal direction thereof. Therefore, the number of the LEDs 17 mounted on one LED board 18 is reduced compared to the configuration in which the LEDs 17 are arranged in the entire longitudinal area of the LED board 18. As a result, the LEDs 17 that are connected in series are lighted on stably. Also, the distance (the interval) between the LEDs included in the LED group of the LED unit LU (the first LED group 171, the second LED group 172) can be decreased. In a conventional backlight unit in which the adjacent LEDs are arranged with a large distance therebetween, unevenness in brightness is locally generated (a portion having brightness lower than surrounding portion is generated between the adjacent LEDs). Such local unevenness in brightness is less likely to be caused in this embodiment.

Second Embodiment

Figure 9:
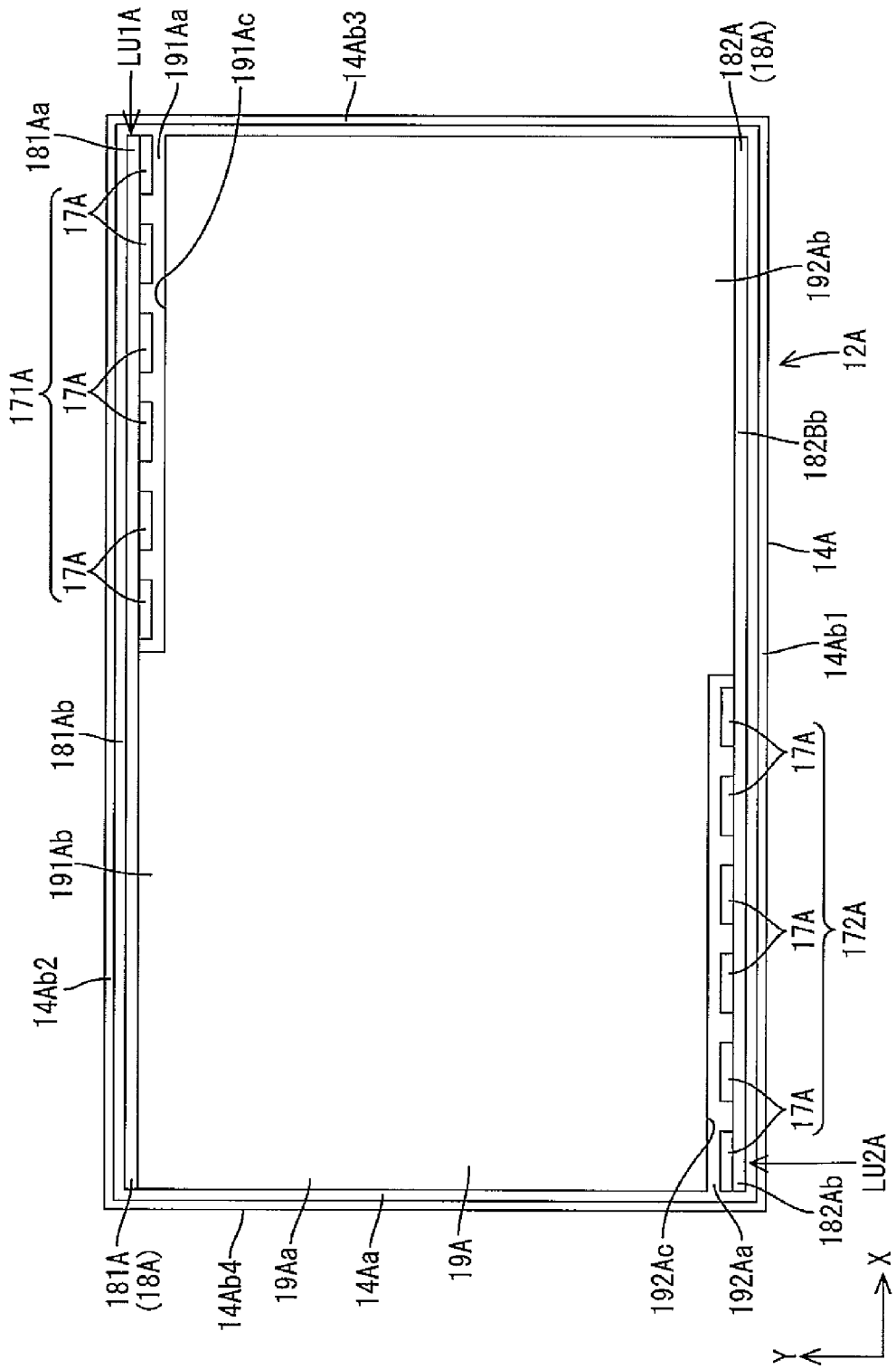
FIG. 9 is a plan view illustrating arrangement of a chassis, a light guide plate, and an LED unit included in the backlight unit according to a second embodiment.

The second embodiment according to the present invention will be described with reference to FIG. 9. FIG. 9 is a plan view of a backlight unit 12A according to the second embodiment including a chassis 14A, a light guide plate 19A, and LED units LU (LU1A, LU2A). In this embodiment, each component corresponding to that in the first embodiment is represented by a reference number in the first embodiment plus "A", and will not be described.

In the backlight unit 12A of this embodiment, the LED unit (the first LED unit LU1A, the second LED unit LU2A) is mounted on each of long-side edge portions of the light guide plate 19A having a rectangular plan view shape. The LED unit may be fixed to each of the long-side edge portions of the light guide plate 19A as is in this embodiment.

Third Embodiment

Figure 10:
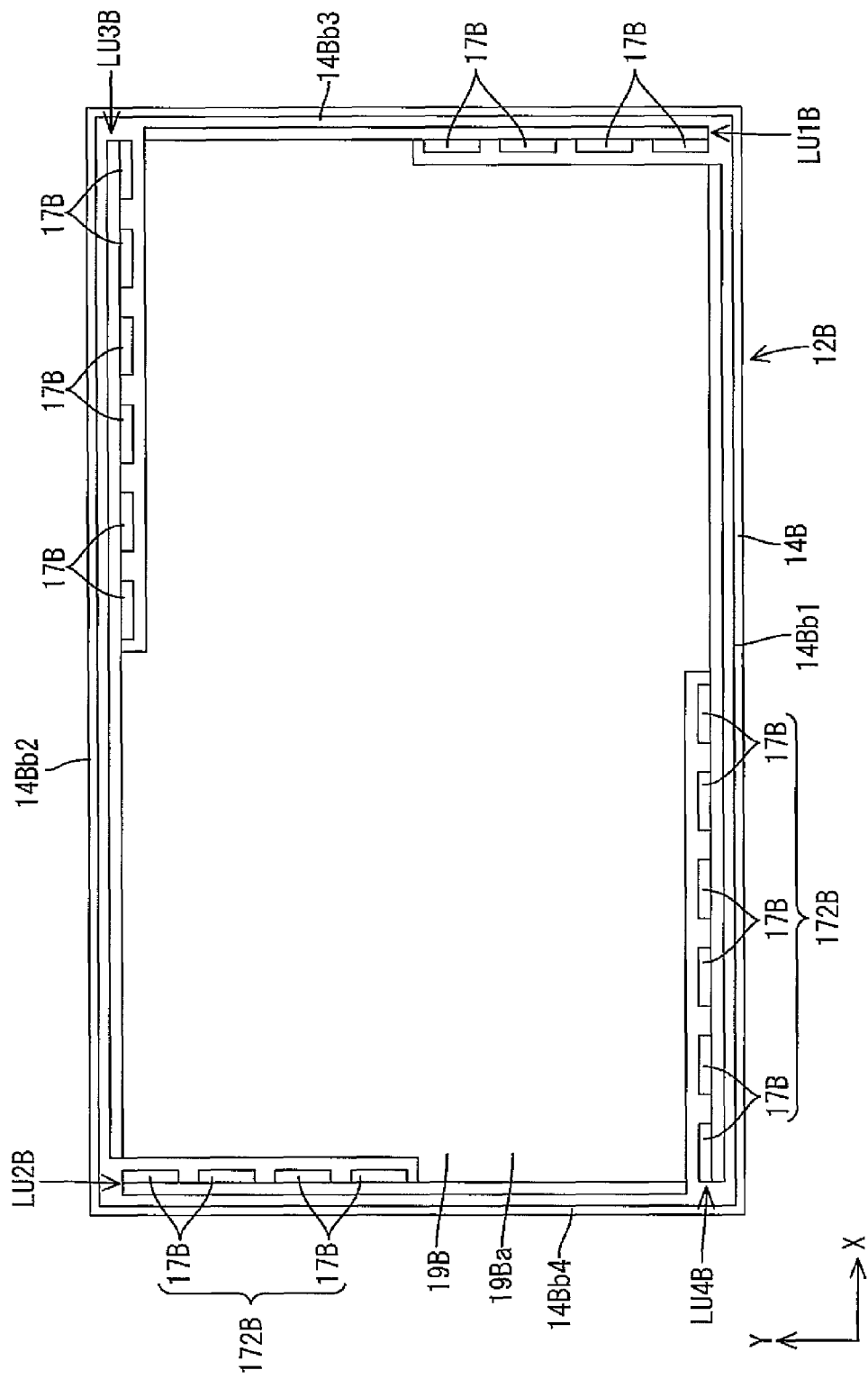
FIG. 10 is a plan view illustrating arrangement of a chassis, a light guide plate, and an LED unit included in the backlight unit according to a third embodiment.

The third embodiment according to the present invention will be described with reference to FIG. 10. FIG. 10 is a plan view of a backlight unit 12B according to the third embodiment including a chassis 14B, a light guide plate 19B, and LED units. In this embodiment, each component corresponding to that in the first embodiment is represented by a reference number in the first embodiment plus "B", and will not be described. In this embodiment, two pairs (two sets) of LED units are arranged to sandwich the light guide plate 19B in the long side direction and the short side direction. Specifically, the backlight unit 12B includes a pair of LED units (the first LED unit LU1B, the second LED unit LU2B) that are arranged on the short side edge portions of the light guide plate 19B and a pair of LED units (a third LED unit LU3B, a fourth LED unit LU4B) that are arranged on the long side edge portions of the light guide plate 19B. Like the backlight unit 12B of this embodiment, two or more sets of LED units may be included. In such a configuration, like this embodiment, it is preferable that the LEDs 17B in the adjacent LED units on the long side and the short side of the light guide plate 19B are not arranged to adjacent to each other. If the LEDs 17B in the adjacent LED units are close to each other on the long side and the short side of the light guide plate 19B, the brightness may be excessively increased in the area of the light guide plate 19B. It is preferable that the long-side light entrance surface (the light entrance portion) and the short-side light entrance surface (the light entrance portion) of the light guide plate 19B are arranged not to be adjacent to each other.

Fourth Embodiment

Figure 11:
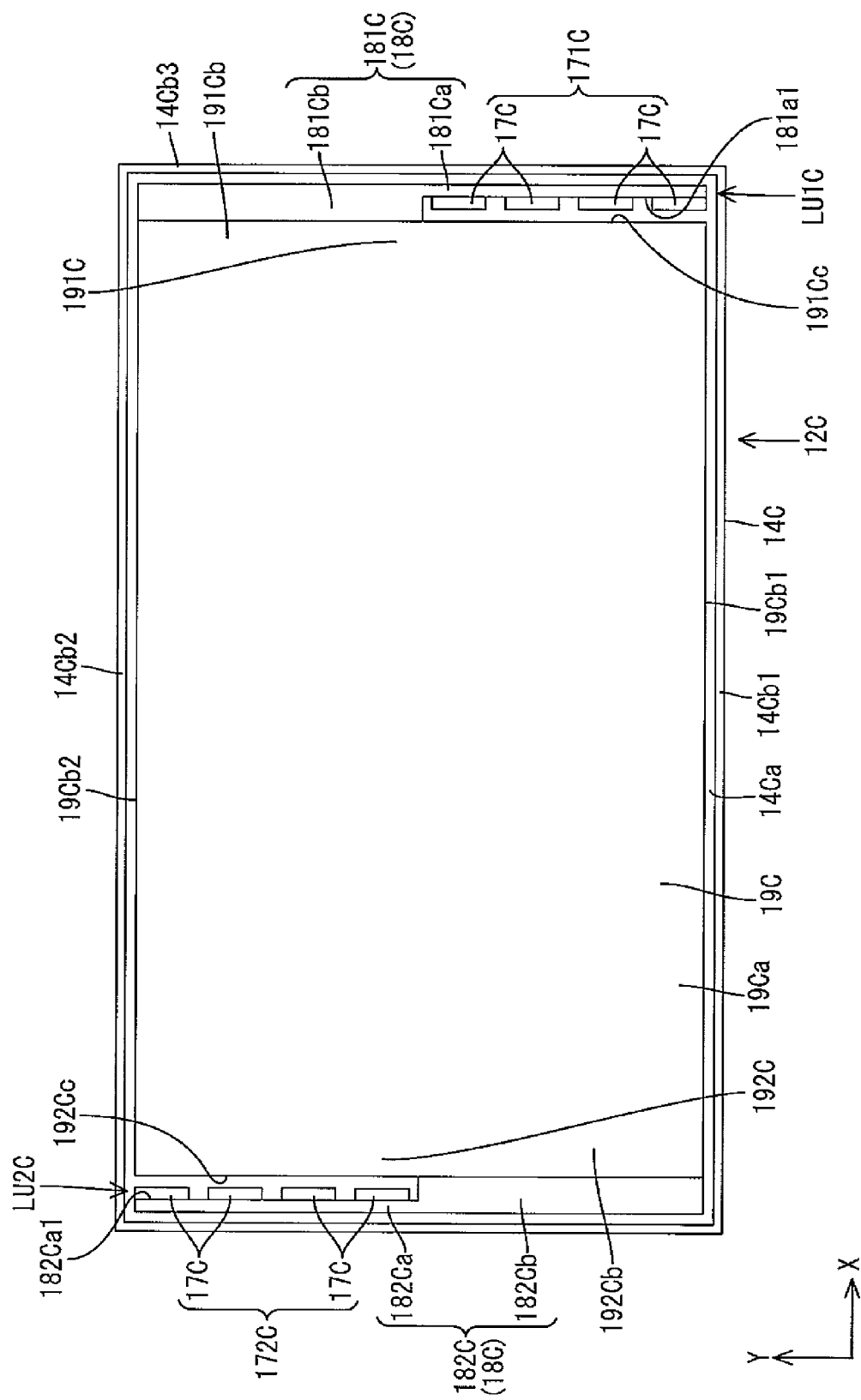
FIG. 11 is a plan view illustrating arrangement of a chassis, a light guide plate, and an LED unit included in the backlight unit according to a fourth embodiment.

The fourth embodiment according to the present invention will be described with reference to FIG. 11. FIG. 11 is a plan view of a backlight unit 12C according to the fourth embodiment including a chassis 14C, a light guide plate 19C, and LED units. In this embodiment, each component corresponding to that in the first embodiment is represented by a reference number in the first embodiment plus "C", and will not be described.

Similar to the first embodiment, the backlight unit 12C includes a pair of LED units LU1C, LU2C that are opposed to each other with having the light guide plate 19C therebetween. The LED units LU1C, LU2C are disposed on short side edge portions 191C, 192C of the light guide plate 19C, respectively.

However, unlike that of the first embodiment, the backlight unit 12C of this embodiment includes the edge portions 191C, 192C having flat edge surfaces on which the LED units LU1C, LU2C are mounted. Thus, unlike the first fixing portion 191b and the second fixing portion 192b of the first embodiment, the edge portions 191C, 192C do not project toward an outer side. Namely, the light guide plate 19C has a horizontally-long rectangular plan view shape. An edge portion 191C of the light guide plate 19C includes a light entrance surface (a first light entrance portion) 191Cc and a first fixing portion 191Cb that are adjacent to each other, and the light entrance surface 191Cc is substantially flush with a surface of the first fixing portion 191Cb. An edge portion 192C of the light guide plate 19C includes a light entrance surface (a second light entrance portion) 192Cc and a second fixing portion 192Cb that are adjacent to each other, and the light entrance surface 192Cc is substantially flush with a surface of the second fixing portion 192Cb.

In the backlight unit 12C of this embodiment, unlike that of the first embodiment, each of the LED units LU1C, LU2C includes an empty portion (a first empty portion 181Cb, a second empty portion 182Cb) and a mount portion (a first mount portion 181Ca, a second mount portion 182Ca) and the empty portions have a thickness (in the X-axis direction, a plate thickness) greater than the mount portions. Each of the empty portions is projected toward the light guide plate 19C further than the LEDs 17C mounted on each of the mount portions (the first mount portion 181Ca, the second mount portion 182Ca)

As illustrated in FIG. 11, the first empty portion 181Cb of the first LED unit LU1C has a thickness greater than that of the first mount portion 181Ca and is projected further than the LEDs 17C mounted on the first mount portion 181C. The first empty portion 181Cb is bonded to the first fixing portion 191Cb with a double-sided tape so that the first LED unit LU1C is fixed to the light guide plate 19C.

The second empty portion 182Cb of the second LED unit LU2C has a thickness greater than that of the second mount portion 182Ca and is projected further than the LEDs 17C mounted on the second mount portion 182Ca. The second empty portion 182b is bonded to the second fixing portion 192Cb with a double-sided tape so that the second LED unit LU2C is fixed to the light guide plate 19C.

Like the backlight unit 12C of this embodiment, the LED unit may include a projected portion (the first empty portion 181CB, the second empty portion 182Cb) so that a gap (a distance) between the LEDs 17C of the LED unit and each of the light entrance surfaces 191Cc, 192Cc of the light guide plate 19C may be set.

The backlight unit 12C of this embodiment also provides technical effects similar to the first embodiment.

Other Embodiments

The present invention is not limited to the embodiments explained in the above description with reference to the drawings. The following embodiments may be included in the technical scope of the present invention, for example.

(1) In the first embodiment, the number of LEDs 17 included in the first LED group 171 of the first LED unit LU1 is equal to that of LEDs included in the second LED group 172 of the second LED unit LU2 but may be different in other embodiment.

(2) In the first embodiment, each LED unit LU is fixed to the light guide plate 19 with using the double-sided adhesive tape but may be with using fixing means such as a screw in other embodiment. It is easy to fix the LED units LU to the light guide plate 19 with using a double-sided adhesive tape like the first embodiment and therefore it is preferable. The double-sided adhesive tape may have light reflectivity. The LED units LU may not be necessarily mounted on the light guide plate 19 with close contact but may be mounted on the light guide plate 19 with a slight gap therebetween as long as the objective of the present invention is achieved. It is preferable that the LED units LU are mounted on the light guide plate 19 with close contact with considering the light entrance efficiency.

(3) In the first embodiment, the first mount portion 181a of the first LED unit LU and the second mount portion 182a of the second LED unit LU are not overlapped with each other with respect to the longitudinal direction of the light guide plate 19 but may be partially overlapped with each other in other embodiment. Namely, light from the first LED unit LU1 and light from the second LED unit LU2 may be supplied to a middle portion of the light guide plate 19. For example, to increase brightness of the middle portion of the liquid crystal display device 10 (the backlight unit 12), the first LED unit LU1 and the second LED unit LU2 may be arranged as described above.

(4) In each of the above embodiments, the TFTs are used as switching components of the liquid crystal display device. However, the technology described herein can be applied to liquid crystal display devices using switching components other than TFTs (e.g., thin film diodes (TFDs)). Furthermore, it can be applied to black-and-white liquid crystal display devices other than the color liquid crystal display device.

(5) In each of the above embodiments, the liquid crystal display device including the liquid crystal panel as a display panel is used. However, the present invention can be applied to display devices including other types of display panels.

(6) In each of the above embodiments, the television device including the tuner is used. However, the technology can be applied to a display device without the tuner. Specifically, the present invention can be applied to liquid crystal display devices used as digital signage or an electronic blackboard.

EXPLANATION OF SYMBOLS

10: Liquid crystal display device (a display device), 11: Liquid crystal panel (a display panel), 12: Backlight unit (a lighting device), 13: Bezel, 14: Chassis, 15: Optical member, 16: Frame, 17: LED (a light source), 171: First LED group (a first light source group), 172: Second LED group (a second light source group), 18: LED board (a light source board), 181: First board, 181a: First mount portion, 181b: First empty portion, 1823: Second board, 182a: Second mount portion, 182b: Second empty portion, 20: Array board, 21: CF board, R: Reflection sheet, TV: Television device

The invention claimed is:

1. A lighting device comprising:
a first light source unit including a first light source group and a first elongated board having a first mount portion and a first empty portion disposed adjacent to the first mount portion, the first light source group including light sources arranged in a line, and the light sources of the first light source group being arranged on the first mount portion;

a second light source unit including a second light source group and a second elongated board having a second mount portion and a second empty portion disposed adjacent to the second mount portion, the second light source group including light sources arranged in a line, and the light sources of the second light source group being arranged on the second mount portion; and a light guide plate being a plate member including:
- a first light entrance portion on one edge portion of the plate member and through which light from the light sources of the first light source group enters the light guide plate;
- a first fixing portion on the one edge portion adjacent to the first light entrance portion and fixing the first light source unit with being in close contact with the first empty portion;
- a second light entrance portion on another edge portion of the plate member on opposite side from the one edge portion so as to be overlapped with the first fixing portion, the second light entrance portion through which light from the light sources of the second light source group enters the light guide plate;
- a second fixing portion adjacent to the second light entrance portion and being overlapped with the first light entrance portion and fixing the second light source unit with being in close contact with the second empty portion; and
- a light exit portion being a plate surface of the plate member and through which light entering the light guide plate through the first light entrance portion and the second light entrance portion exits the light guide plate; wherein the first board has a shape such that the first empty portion protects farther than the light sources mounted on the first mount portion, and the second board has a shape such that the second portion protects farther than the light sources mounted on the second mount portion.

2. The lighting device according to claim 1, wherein in the light guide plate, the first fixing portion projects toward an outer side from the first light entrance portion, and the second fixing portion projects toward the outer side from the second light entrance portion.

3. The lighting device according to claim 2, wherein
the first board has a shape such that a surface of the first mount portion where the light sources are mounted and a surface of the first empty portion that is in close contact with the first fixing portion are flush with each other, and the second board has a shape such that a surface of the second mount portion where the light sources are mounted and a surface of the second empty portion that is in close contact with the second fixing portion are flush with each other.

4. The lighting device according to claim 1, wherein
the light guide plate has a shape such that a surface of the first light entrance portion opposite the light sources of the first light source group and a surface of the first fixing portion that is in close contact with the first empty portion are flush with each other and a surface of the second light entrance portion opposite the light sources of the second light source group and a surface of the second fixing portion that is in close contact with the second empty portion are flush with each other.

5. The lighting device according to claim 1, wherein
the first light source unit is fixed to the light guide plate such that the first empty portion is bonded to the first fixing portion with a double-sided adhesive tape, and the second light source unit is fixed to the light guide plate such that the second empty portion is bonded to the second fixing portion with a double-sided adhesive tape.

6. The lighting device according to claim 1, wherein the light sources of the first light source group and the second light source group are arranged at same intervals.

7. A display device comprising:
the lighting device according to claim 1; and
a display panel displaying with using light from the lighting device.

8. The display device according to claim 7, wherein the display panel is a liquid crystal panel including a pair of substrates and liquid crystals sealed between the substrates.

9. A television device comprising the display device according to claim 7.

* * * * *